Patented Jan. 27, 1953

2,626,947

UNITED STATES PATENT OFFICE 2,626,947

DECOLORIZATION OF SYNTHETIC FOLIC ACID

David I. Weisblat and Arthur R. Hanze, Kalamazoo, Mich., assignors to The Upjohn Company, Kalamazoo, Mich., a corporation of Michigan No Drawing. Application April 7, 1951, Serial No. 219,901

5 Claims. (Cl. 260—251.5)

This invention relates to the purification of a class of nitrogen heterocycles known as the pterins, and in particular to the purification of synthetic liver *Lactobacillus casei* factor or pteroylglutamic acid.

Several methods for the synthesis of *L. casei* factor, also known as folic acid and pteroylglutamic acid, have been described by Waller et al., J. Am. Chem. Soc. 70, 19–28 (1948). All known methods of synthesizing folic acid, which are dependent upon the condensation of various relatively complex acids and complex amines, result in products containing varying proportions of various undesired isomers, oxidation products, unreacted intermediates, condensation and polymerization products, hydrolysis and degradation products. Many of these side products are closely related to the biologically active folic acid and, as would be expected, possess similar physical and chemical properties, but for the most part are biologically inactive. Folic acid can be separated readily from many of its natural contaminants, but it has been difficult to separate it from those associated pterins which occur in the mixtures resulting from chemical synthesis.

Numerous methods have been described for the purification of folic acid, such as by adsorption on ion-exchange resins, as described by J. J. Pfiffner et al., J. Am. Chem. Soc. 69, 1476 (1947), by solution in alkali and precipitation of the pteroylglutamic acid therefrom at a pH of about 3.0 to 4.0, as described by Coy W. Waller in U. S. Patent 2,466,665, or by solution in a strong acid followed by dilution with water to effect precipitation of the dissolved folic acid as described by Coy W. Waller in U. S. Patent 2,474,022.

Although previously known methods for the purification of synthetic folic acid are satisfactory for the preparation of material containing up to about 80 percent folic acid, they are not very satisfactory for the commercial production of folic acid for pharmaceutical use, since the process must be repeated several times in order to remove the closely related pterins. A particularly effective method for the purification of folic acid is described in the copending application by Arthur R. Hanze, Serial No. 198,473, filed November 30, 1950. According to this method, purification is effected by contacting an alkaline solution of impure folic acid with a finely divided solid particulate oxide, hydroxide or carbonate of a metal of group II of the periodic table having an atomic number between 12 and 56, both inclusive, for example, calcium hydroxide and magnesium hydroxide, separating the solid therefrom, and recovering the folic acid from the clarified alkaline solution. In this manner it is possible to obtain material containing more than 90 percent folic acid from material containing about 65 percent folic acid.

Although material containing more than 90 percent folic acid is of sufficient biological activity for therapeutic use, in many instances material of this purity contains a slight amount of highly colored pigment which causes it to be rejected for failure to comply with the U. S. P. requirements as to color.

The principal object of the present invention is to provide a process for the purification of folic acid containing highly colored impurities to a product that complies with the U. S. P. requirements as to color.

It has been found, quite unexpectedly, that the highly colored pigment which is present in such substantially pure synthetic folic acid preparations, can be oxidized by hydrogen peroxide to a form which can be conveniently and rapidly separated from the folic acid. Folic acid would be expected to react to form an amine oxide; however, under the conditions of the process of the present invention, the hydrogen peroxide reacts with or affects only the unwanted pigment.

In accordance with the process of our invention, the highly colored pigment contaminating the substantially pure synthetic folic acid can be separated or destroyed by dissolving the crude folic acid in dilute aqueous alkali, adding a small amount of hydrogen peroxide, allowing the solution to stand for a period between approximately 15 minutes and approximately 1 hour, separating the insoluble precipitate which forms, and recovering folic acid from the clarified alkaline solution. Among the bases that can be employed in the preparation of the alkaline solution of folic acid are lithium hydroxide, potassium hydroxide, sodium hydroxide, calcium hydroxide, barium hydroxide, sodium carbonate, potassium carbonate, and the like. From 90 to 98 percent or more of the folic acid originally present in the solution can be recovered in purified form by merely heating the clarified solution to about 90 degrees centigrade or higher, adjusting the pH of the solution to approximately 3.0 and allowing the folic acid to crystallize therefrom. The crystals of folic acid which separate upon acidification at an elevated temperature have a more desirable crystalline form than those obtained when the acidification is conducted at or about room temperature.

As the excess base must be neutralized in order to precipitate the purified folic acid, only an amount of alkali sufficient to dissolve the crude folic acid and its associated genetic impurities should be used, about three molecular equivalents of base per mole of folic acid being most satisfactory.

Solutions containing about 3 to 10 grams of folic acid per liter, and preferably such as contain approximately 8 grams per liter, can be treated in accordance with the process of this invention. The crude folic acid can be dissolved directly in the required volume of dilute alkali, or more conveniently in a small volume of a one-normal solution of alkali and then diluted to a suitable concentration of folic acid for the subsequent treatment with peroxide. Between about 0.3 and 1.0 gram of hydrogen peroxide per gram of folic acid is satisfactory, about 0.5 gram being preferred. Although the process of the present invention is particularly adapted to the treatment of folic acid having a purity of at least 65 percent, the use of the process for the treatment of preparations of lower purity may require greater proportions of hydrogen peroxide and would accordingly not be as economical.

If desired, the peroxide treatment of the present invention can be carried out in the presence of an inorganic adsorbent such as solid particulate calcium hydroxide, magnesium carbonate, barium carbonate, magnesium hydroxide, zinc carbonate, and the like, as described in the copending application of Arthur R. Hanze, Serial No. 198,473, filed November 30, 1950 and as disclosed in the examples herein.

The following examples are given by way of illustration only and are not to be construed as limiting.

Example 1

A solution was prepared by dissolving 10 grams of crude folic acid which contained 8.37 grams of pure folic acid in about 65 milliliters of one-normal aqueous sodium hydroxide solution and diluting the resulting solution to one liter with water.

A mixture of 800 milligrams of powdered calcium hydroxide (slaked lime) and 100 milliliters of the previously prepared solution of folic acid sodium salt was stirred at about 25 degrees centigrade for approximately one and one-half hours and filtered through a filter-aid (Celite 545) pad. The filter cake was washed with 25 milliliters of water and the filtrate and washings were combined and diluted to 250 milliliters with water. After 10 milliliters of the diluted filtrate was removed for assay purposes, the remaining 240 milliliters was heated to boiling, the pH of the solution adjusted to approximately 3.0 and the solution allowed to stand in a refrigerator for about twelve hours. The crystalline folic acid which formed was separated by filtration and dried to obtain 775 milligrams of material which contained 92 percent folic acid (88.7 percent recovery) and had a brownish-orange color.

A mixture of 800 milligrams of calcium hydroxide and 100 milliliters of the previously prepared solution of folic acid sodium salt was stirred for one hour. Ten milliliters of 3 percent hydrogen peroxide solution then was added while the stirring was continued for 15 minutes, after which an additional 10 milliliters of 3 percent aqueous hydrogen peroxide solution was added and stirring was continued for an additional 15 minutes, whereupon approximately 30 milligrams of powdered calcium hydroxide was added and the stirring was continued for 10 minutes. The mixture was then filtered through a filter-aid (Celite 545) pad and the filter cake washed with 25 milliliters of water. The filtrates were then combined and diluted with water to a volume of 250 milliliters. After 10 milliliters of solution had been removed for assay purposes, the remaining 240 milliliters of clarified solution was heated to approximately 100 degrees centigrade and the pH adjusted to approximately 3.0. After the solution had been cooled for about 6 hours, the crystalline material was separated by filtration and dried to obtain 745 milligrams of material which assayed 95.3 percent folic acid (88.3 percent recovery) and which was of satisfactory light yellow color and conformed to the U. S. P. specifications in this respect.

Example 2

A solution of crude folic acid was prepared by dissolving 10 grams of material which contained 8.71 grams of folic acid in 65 milliliters of one-normal sodium hydroxide and diluting with water to a volume of 1000 milliliters.

A mixture of 100 milliliters of the above solution of folic acid sodium salt and 800 milligrams of powdered calcium hydroxide was stirred at room temperature for 1½ hours, filtered through a filter-aid (Celite 545) pad, the filter cake washed with 25 milliliters of water and the filtrate and washings combined. To the combined filtrate was then added 10 milliliters of 3 percent aqueous hydrogen peroxide solution and the mixture stirred for 30 minutes, whereupon a brown solid settled out. Approximately 25 milligrams of calcium hydroxide was then added and the stirring continued for 45 minutes, the solution filtered through a filter-aid (Celite 545) pad, the filter cake washed with 25 milliliters of water, the filtrates combined, and diluted with water to a volume of 250 milliliters. After 10 milliliters of the diluted solution had been removed for assay purposes, the remaining 240 milliliters was heated to approximately 100 degrees centigrade and the pH adjusted to approximately 3.0 by the addition of one-normal hydrochloric acid. The resulting mixture was allowed to stand for about 12 hours in a refrigerator, filtered and the precipitate dried to obtain 770 milligrams of material which assayed 95.8 percent folic acid (88.2 percent return) and had a light yellow color that conformed to U. S. P. specifications in this respect.

Example 3

To 100 milliliters of the solution of folic acid sodium salt prepared in Example 2, which contained a total of 0.871 gram of folic acid, was added 10 milliliters of 3 percent aqueous hydrogen peroxide and the solution was stirred for approximately 30 minutes, whereupon a brown solid settled out. The solution was then filtered through a pad of filter-acid (Celite 545), the filter cake washed with 10 milliliters of water and the filtrates and washings were combined and diluted with water to a volume of 250 milliliters. The solution was heated, acidified to a pH of approximately 3.0 and the folic acid recovered as in Example 2. The color and purity of the folic acid were improved by this treatment.

Example 4

A mixture of 100 milliliters of the solution of folic acid sodium salt prepared in Example 2, which contained a total of 0.871 gram of folic acid, and 800 milligrams of powdered magnesium hydroxide was stirred at room temperature for 1½ hours, filtered through a filter-aid (Celite 545) pad, the filter cake washed with 25 milliliters of water and the filtrate and washings combined. To the combined filtrate was then added 10 milliliters of 3 percent aqueous hydrogen peroxide solution and the mixture stirred for 30 minutes, whereupon a brown solid settled out. Approximately 25 milligrams of magnesium hydroxide was then added and the stirring continued for 45 minutes, the solution filtered through a filter-aid (Celite 545) pad, the filter cake washed with 25 milliliters of water, the filtrates combined, and diluted with water to a volume of 250 milliliters. After 10 milliliters of the diluted solution had been removed for assay purposes, the remaining 240 milliliters was heated to approximately 100 degrees centigrade and the pH adjusted to approximately 3.0 by the addition of one-normal hydrochloric acid. The resulting mixture was allowed to stand for about 12 hours in a refrigerator, filtered and the precipitate dried to obtain 766 milligrams of material which assayed 95 percent folic acid (88 percent return) and had a light yellow color that conformed to U. S. P. specification in this respect.

Inasmuch as the foregoing specification comprises preferred embodiments of the invention, it is to be understood that the invention is not limited thereto and that variations and modifications can be made in conventional manner by those skilled in the art without departing from the scope of this invention or the claims hereinafter.

We claim:

1. A process for the purification of synthetic folic acid containing highly colored impurities comprising contacting an aqueous alkaline solution of the folic acid with hydrogen peroxide, whereby the highly colored impurities are oxidized and precipitated, removing the precipitate thus formed, and recovering folic acid of improved color and purity from the alkaline solution by acidification.

2. A process for the purification of a synthetic folic acid of substantial purity containing highly colored impurities, which comprises contacting an aqueous alkaline solution of the folic acid with about 0.3 to 1.0 part of hydrogen peroxide per part of folic acid for a period between approximately 15 minutes and approximately one hour, whereby the highly colored impurities are oxidized and precipitated, removing the precipitate and recovering folic acid of improved color and purity from the alkaline solution by acidification.

3. A process for the purification of a synthetic folic acid of substantial purity containing highly colored impurities, which comprises dissolving the folic acid in a minimal proportion of an aqueous alkaline solution and diluting the solution to a concentration within the range of approximately 4 to approximately 8 grams of folic acid per liter of solution, contacting the alkaline solution with an amount of hydrogen peroxide equivalent to about 50 percent by weight of the folic acid content of the solution for a period between approximately 15 minutes and approximately one hour, whereby the highly colored impurities are oxidized and precipitated, separating the precipitate from the alkaline solution and recovering folic acid of improved color and purity from the clarified alkaline solution by acidification.

4. A process for the purification of a synthetic folic acid having a purity of at least 65 percent but containing highly colored impurities, which comprises dissolving the folic acid in an amount of one-normal aqueous sodium hydroxide solution equivalent to approximately 3 moles of sodium hydroxide per mole of folic acid, diluting the resulting alkaline solution with water to a concentration equivalent to approximately 8 grams of folic acid per liter of solution, contacting the alkaline solution with approximately 8 grams of solid finely divided calcium hydroxide and about 4 grams of hydrogen peroxide per liter of solution for a period of approximately 1½ hours, separating the precipitated impurities, solid calcium hydroxide and pterins adsorbed thereon, and recovering folic acid of improved color and purity from the clarified alkaline solution by acidification of the solution to a pH of approximately 3.0.

5. A process for the purification of a synthetic folic acid having a purity of at least 65 percent but containing highly colored impurities, which comprises dissolving the folic acid in an amount of one-normal aqueous sodium hydroxide solution equivalent to approximately 3 moles of sodium hydroxide per mole of folic acid, diluting the resulting alkaline solution with water to a concentration equivalent to approximately 8 grams of folic acid per liter of solution, contacting the alkaline solution with approximately 8 grams of solid finely divided magnesium hydroxide and about 4 grams of hydrogen peroxide per liter of solution for a period of approximately 1½ hours, separating the precipitated impurities, solid magnesium hydroxide and pterins adsorbed therefrom, and recovering folic acid of improved color and purity from the clarified alkaline solution by acidification of the solution to a pH of approximately 3.0.

DAVID I. WEISBLAT.
ARTHUR R. HANZE.

No references cited.